US010447116B2

(12) United States Patent
Nakazawa

(10) Patent No.: US 10,447,116 B2
(45) Date of Patent: Oct. 15, 2019

(54) ELECTRIC MOTOR AND MACHINE TOOL

(71) Applicant: FANUC CORPORATION, 3580, Shibokusa, Yamanashi (JP)

(72) Inventor: Yasuyuki Nakazawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

(21) Appl. No.: 15/907,644

(22) Filed: Feb. 28, 2018

(65) Prior Publication Data
US 2018/0262090 A1  Sep. 13, 2018

(30) Foreign Application Priority Data
Mar. 10, 2017 (JP) .................................. 2017-046216

(51) Int. Cl.
| H02K 9/24 | (2006.01) |
| H02K 5/18 | (2006.01) |
| H02K 9/04 | (2006.01) |
| H02K 7/04 | (2006.01) |
| H02K 7/14 | (2006.01) |
| H02K 5/22 | (2006.01) |

(52) U.S. Cl.
CPC ............ *H02K 9/24* (2013.01); *H02K 5/18* (2013.01); *H02K 9/04* (2013.01); *H02K 5/225* (2013.01); *H02K 7/04* (2013.01); *H02K 7/14* (2013.01); *H02K 2213/06* (2013.01)

(58) Field of Classification Search
CPC .. H02K 9/24; H02K 9/04; H02K 7/04; H02K 5/18
USPC ............................................... 310/58, 59, 62
See application file for complete search history.

(56) References Cited

U.S. PATENT DOCUMENTS

| 6,333,851 B1 * | 12/2001 | Shih .......................... G06F 1/20 165/104.33 |
| 8,344,563 B2 * | 1/2013 | Kamiki .................... H02K 9/04 310/52 |
| 2014/0175919 A1 * | 6/2014 | Miyamoto ............... H02K 9/04 310/54 |

FOREIGN PATENT DOCUMENTS

| JP | 8-322201 | 12/1996 |
| JP | 2004-88850 | 3/2004 |
| JP | 2011-101549 | 5/2011 |
| JP | 2012-196051 | 10/2012 |
| JP | 5394116 | 10/2013 |

(Continued)

OTHER PUBLICATIONS

Notice of Reasons for Refusal dated Jul. 31, 2018 in corresponding Japanese Patent Application No. 2017-046216.

*Primary Examiner* — Terrance L Kenerly
(74) *Attorney, Agent, or Firm* — Wenderoth, Lind & Ponack, L.L.P.

(57) ABSTRACT

An electric motor includes a stator having a tubular shape, a rotor rotatable around a rotary axis and having a rotary spindle, a first housing part disposed so as to partially house the rotary spindle, a second housing part disposed at the other end of the stator in the rotary axis direction, a third housing part at a side opposite to the first housing part in the rotary axis direction with respect to the second housing part, a plurality of ventilation parts formed so as to communicate with at least the stator, the second housing part, and the third housing part, and a plurality of fans for ventilating the plurality of ventilation parts, the plurality of fans being disposed in the third housing part on a plane perpendicular to the rotary axis so as not to overlap the rotary axis.

4 Claims, 8 Drawing Sheets

(56) References Cited

FOREIGN PATENT DOCUMENTS

JP    2014-230487    12/2014

\* cited by examiner

ELECTRIC MOTOR AND MACHINE TOOL

This application is based on and claims the benefit of priority from Japanese Patent Application No. 2017-046216, filed on Mar. 10, 2017, the content of which is incorporated herein by reference.

BACKGROUND OF THE INVENTION

Field of the Invention

The present invention relates to an air-cooled electric motor and a machine tool including the electric motor.

Related Art

A main spindle in a recent machine tool rotates at a higher speed, and concurrently a motor (electric motor) connected to such a main spindle also rotates at a higher speed. Such a high-speed rotating motor requires high accuracy balance correction to a rotor so as to prevent excessive vibration during high-speed rotation. Therefore, motors each configured to have a balance correcting component on the rear side thereof are increasing.

Many machine tools adopt a center through cooling type. In this case, a motor having a spindle with a through hole is used. In general, such a motor is configured to have a rotary joint connected to a supply unit for supplying coolant on the rear side of the motor.

In order to realize the above-described structure, such a motor need to have a predetermined space on the rear side thereof. However, a general air-cooled type motor has a cooling fan on the rear end part thereof, and thus it is difficult to provide the above-mentioned space.

To deal with this, for example, a structure in which a distance block is disposed between a motor main body and a cooling fan is proposed. (Refer to Patent Document 1, as an example. In this document, the distance block is referred to as a tubular member.)

Alternatively, for example, a structure in which an insertion hole is formed in a rotary spindle of a cooling fan is proposed. (Refer to Patent Document 2, as an example.)

Patent Document 1: Japanese Unexamined Patent Application, Publication No. 2004-88850
Patent Document 2: Japanese Patent No. 5394116

SUMMARY OF THE INVENTION

However, in the structure disclosed in Patent Document 1, a motor has a long overall length because of arrangement of the distance block. Thereby, the natural frequency thereof is lowered, and a cooling fan or the like is likely to be damaged by resonance, in some cases.

In the structure disclosed in Patent Document 2, the cooling performance of a cooling fan is lowered, or the structure has difficulty in designing and manufacturing, in some cases.

In addition, usage of one cooling fan in general has a problem that the cooling performance in the motor is greatly lowered when the cooling fan fails.

The object of the present invention is to provide an electric motor capable of ensuring a necessary space by use of a plurality of fans and devising of arrangement of the plurality of fans, and a machine tool including such an electric motor. Another object of the present invention is to provide an electric motor capable of suppressing a rapid decrease in cooling performance by use of a plurality of fans, and a machine tool including such an electric motor.

(1) The present invention relates to an electric motor (for example, an electric motor 1, an electric motor 1A, an electric motor 1B or an electric motor 1C, which will be described below) including a stator (for example, a stator 2, which will be described below) having a tubular shape, a rotor (for example, a rotor 3, which will be described below) rotatable around a rotary axis (for example, a rotary axis X, which will be described below), the rotor having a rotary spindle (for example, a rotary spindle 31 or a rotary spindle 31A, which will be described below) disposed along the rotary axis, a first housing part (for example, a first housing part 41, which will be described below) disposed at one end the stator in a rotary axis direction (for example, a rotary axis direction DX, which will be described below) so as to partially house the rotary spindle, the rotary axis direction corresponding to a direction in which the rotary axis extends, a second housing part (for example, a second housing part 42, which will be described below) disposed at the other end of the stator in the rotary axis direction, a third housing part (for example, a third housing part 43, a third housing part 43A, a third housing part 43B or a third housing part 43C, which will be described below) disposed on an opposite side to the first housing part in the rotary axis direction with respect to the second housing part, a plurality of ventilation parts (for example, a plurality of ventilation passages 9, which will be described below) formed so as to communicate with at least the stator, the second housing part and the third housing part, and a plurality of fans (for example, a plurality of cooling fans 7, a plurality of cooling fans 7A, a plurality of cooling fans 7B or a plurality of cooling fans 7C, which will be described below) for ventilating the plurality of ventilation parts, the plurality of fans being disposed in the third housing part on a plane perpendicular to the rotary axis so as not to overlap with the rotary axis.

(2) In the electric motor according to (1), the third housing part may include an end face part (for example, 44, 44A or 44B, which will be described below) disposed on an opposite side to the second housing part in the rotary axis direction, and the end face part may include a plurality of exhaust parts (for example, a plurality of exhaust ports 93, a plurality of exhaust ports 93A or a plurality of exhaust ports 93B, which will be described below) each corresponding to one end part of each of the plurality of ventilation parts, the plurality of exhaust parts being disposed so as to respectively correspond to the plurality of fans, and an opened part (for example, an opened part 45, an opened part 45A or an opened part 45B, which will be described below) or an openable part (for example, an openable part 46, which will be described below) provided in a region located on a side of the rotary axis with respect to the plurality of exhaust parts, the region including a region crossing the rotary axis.

(3) In the electric motor according to (2), the openable part may be configured to have a closing part (for example, a closing part 47, which will be described below) disposed removably and serve as the opened part (for example, the opened part 45B, which will be described below) after removal of the closing part.

(4) In the electric motor according to any one of (1) to (3), each of the plurality of fans may be configured to be slidable along a plane direction perpendicular to the rotary axis direction, and to be attachable to and detachable from the third housing part.

(5) The present invention relates to a machine tool including the electric motor according to any one of (1) to (4).

The present invention enables to provide an electric motor capable of ensuring a necessary space by use of a plurality of cooling fans and devising of arrangement of the plurality of cooling fans, and a machine tool including such an electric motor. The present invention further enables to provide an electric motor capable of suppressing a rapid decrease in cooling performance by use of a plurality of fans, and a machine tool including such an electric motor.

DETAILED DESCRIPTION OF THE INVENTION

Figure 1:
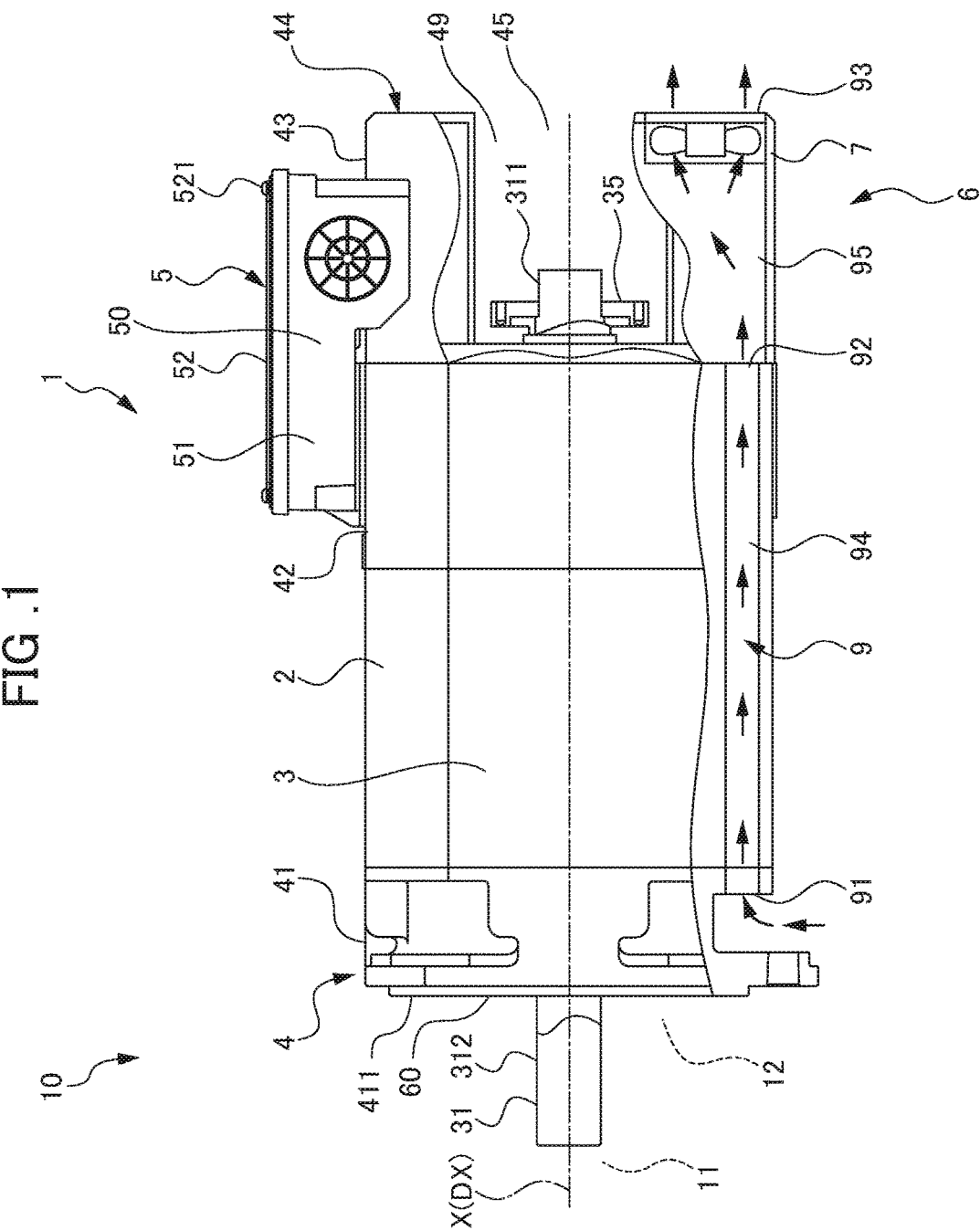
FIG. 1 is a cross sectional side view of an electric motor according to a first embodiment.

Hereinafter, embodiments according to the present invention will be described in detail with reference to the drawings. It is noted that, in the descriptions of the second embodiment through to the fourth embodiment, the same components as those of the first embodiment are denoted by the same reference numerals, and the corresponding components are denoted by corresponding reference numerals with regularity. Thereby, the descriptions thereof will be omitted (for example, a component with a reference numeral 7 in the first embodiment will be denoted by a reference numeral 7A in the second embodiment).

First Embodiment

Figure 2:
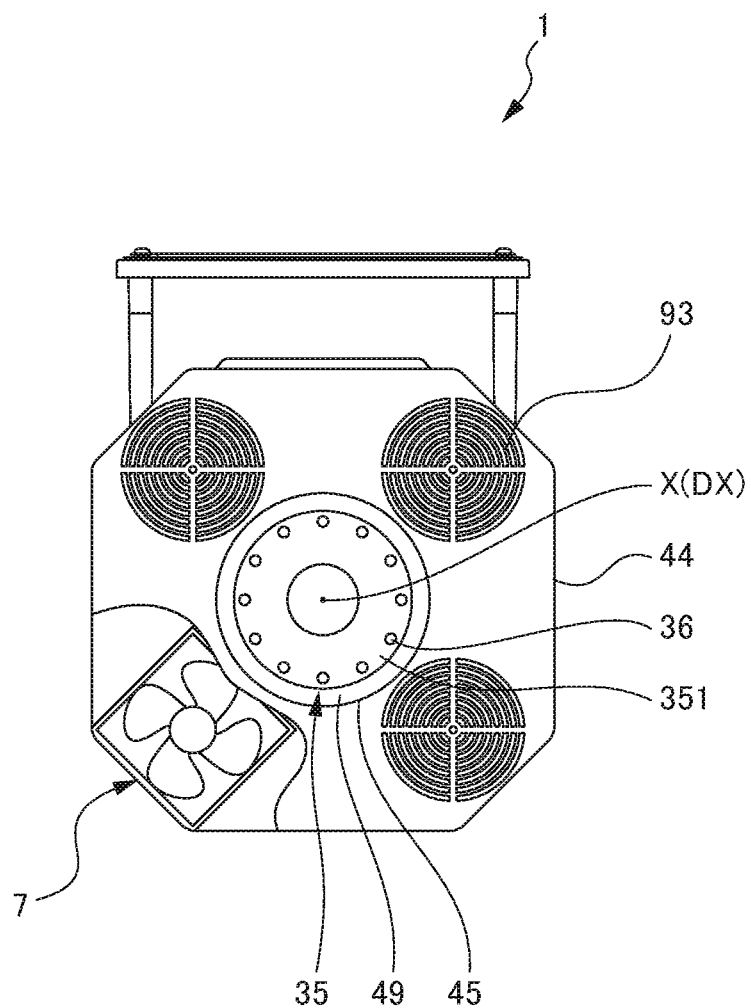
FIG. 2 is a view of the electric motor according to the first embodiment as viewed from the rear side thereof (other end side) in the axial direction.

An electric motor according to the first embodiment is described with reference to FIG. 1 and FIG. 2. FIG. 1 is a cross sectional side view of the electric motor according to the first embodiment. FIG. 2 is a view of the electric motor according to the first embodiment as viewed from the rear side thereof (other end side) in the axial direction. The axial direction herein means a direction in which a rotary axis X of a rotary spindle 31 of a rotor 3 (described below) extends (rotary axis direction DX). The front side in the axial direction (one end side in the rotary axis direction DX) herein means the side of a main-spindle attachment surface 411 attached to a main spindle 11 of a machine tool 10, meaning the left side in FIG. 1, as an example. The rear side in the axial direction (other end side in the rotary axis direction DX) herein means the side of an end face part 44 of a third housing part 43, meaning the right side in FIG. 1, as an example.

An electric motor 1 according to the present embodiment, which is an induction motor as an example, is operated by an electromagnetic induction effect from the winding (not shown) provided in a stator 2 (described below) to the bare conductor (not shown) which is provided on the rotor 3 so as to be short-circuited. Induction motors are widely used because of their simple configurations and easy maintainability.

As shown in FIG. 1 and FIG. 2, the electric motor 1 includes the stator 2, the rotor 3, a housing 4, and a terminal box 5. The electric motor 1, which is an air-cooled electric motor, has a cooling mechanism 6.

The stator 2 has a tubular shape. Examples of tubular shapes include, but are not limited to, polygonal tubular shapes such as an octagonal tubular shape. The rotor 3 (described below) is disposed rotatably therein (inside the stator 2). The stator 2 is configured with a plurality of magnetic steel plates laminated in the axial direction. A plurality of slots (not shown) are formed at equal intervals in the circumferential direction on the peripheral wall part of the stator 2. Each of the slots is provided so as to extend in the axial direction of the stator 2 and houses the winding (not shown).

The rotor 3 includes a rotary main body (not shown) and the rotary spindle 31. The rotor 3 is a member rotatable around the rotary axis X. The rotary main body, which has a columnar shape, is disposed so as to be coaxial with the rotary spindle 31. The rotary main body is fixed to the rotary spindle 31. A short-circuited bare conductor (not shown) is disposed on the rotary main body. The rotary main body is at least partially disposed inside the stator 2. The rotary main body is disposed rotatably around the rotary axis X.

The rotary spindle 31 is disposed along the rotary axis X. The rotary spindle 31 rotates integrally with the rotary main body. The rotary spindle 31 is configured to include a first spindle part 311 disposed on the rear side in the axial direction, and a second spindle part 312 disposed on the front side in the axial direction.

The first spindle part 311 is rotatably supported by a second housing part 42 (described below). The second spindle part 312 is disposed so as to be partially housed in a first housing part 41. The second spindle part 312 is connected to the main spindle 11 (not shown) of the machine tool 10 (not shown).

A balance correcting component 35 is attached to the first spindle part 311. The balance correcting component 35, which has a disk shape, is disposed coaxially with the rotary spindle 31. A plurality of taps 36 extending in the rotary axis direction DX are disposed at equal intervals in the circumferential direction on an end face 351 disposed on the rear side in the axial direction of the balance correcting component 35. Set screws (not shown) can be installed in the plurality of taps 36, and the balance of the rotor 3 is corrected by adjusting weight, number and arrangement of the set screws.

The balance correcting component 35 is disposed so as to be housed in an internal space 49 of the third housing part 43 (described below). The balance correcting component 35 is disposed so as to be visible and accessible from the outside through an opened part 45 formed so as to communicate with the internal space 49.

The housing 4 has the first housing part 41, the second housing part 42, and the third housing part 43. The first housing part 41 is disposed on the front side in the axial direction of the stator 2 (on one end side in the rotary axis direction DX). The first housing part 41 partially houses the second spindle part 312.

A main-spindle head 12 (not shown) of the machine tool 10 (not shown) is connected to the main-spindle attachment surface 411 disposed on the front side in the axial direction of the first housing part 41. A labyrinth member 60 having a labyrinth structure is provided on the side of the main-spindle attachment surface 411 of the first housing part 41. The labyrinth member 60 prevents oil or the like in the environmental atmosphere from entering into the electric motor 1.

The second housing part 42 is disposed on the rear side in the axial direction of the stator 2 (on the other end side in the rotary axis direction DX). The second housing part 42 rotatably supports the first spindle part 311 of the rotary spindle 31. On the rear side in the axial direction with respect to the second housing part 42, the third housing part 43 for housing a plurality of cooling fans 7 (fans) (described below) is disposed.

The third housing part 43 is disposed on the rear side in the axial direction with respect to the second housing part 42. The third housing part 43 is disposed on the opposite side to the first housing part 41 in the rotary axis direction DX with respect to the second housing part 42. The third housing part 43 houses the plurality of cooling fans 7 (described below). The third housing part 43 has the opened part 45 formed at the center part including the rotary axis X, and the internal space 49 communicating with the opened part 45. The third housing part 43 will be described in detail below in conjunction with the description of the cooling fans 7.

The terminal box 5 is attached on the upper surfaces of the second housing part 42 and the third housing part 43. The terminal box 5 houses a terminal block 50 therein. The terminal box 5 includes a box part 51 and a lid part 52.

The box part 51 is a box body having a rectangular shape in a plan view, and the upper surface thereof is opened. The lid part 52, which is a plate having a rectangular shape in a plan view, is disposed so as to close the opening of the box part 51. The lid part 52 is fixed by screws 521 so that the four corners of the lid part 52 are attached to the upper end surfaces of the four side parts of the box part 51. This ensures waterproof performance and dust-proof performance of the terminal block 50.

A lead wire (not shown) of each phase of the winding disposed in the stator 2 is led inside the terminal box 5. An insulation displacement connector (not shown) is attached to a tip of each lead wire, and is electrically connected to a conductive plate by a screw (not shown). A power cable (not shown) is also connected to the conductive plate by jointly screwing by a screw (not shown).

In the electric motor 1, the stator 2 and the rotor 3 generate heat. Therefore, the electric motor 1 has the cooling mechanism 6 for suppressing performance deterioration and the like from occurring due to temperature rise. The cooling mechanism 6 includes a plurality of ventilation passages 9 (ventilation parts), the plurality of cooling fans 7 being disposed so as to respectively correspond to the plurality of ventilation passages 9, and the above-described third housing part 43.

Each of the ventilation passages 9 is formed so as to communicate with at least the stator 2, the second housing part 42 and the third housing part 43. In the present embodiment, each of the ventilation passages 9 is formed so as to communicate with the first housing part 41, the stator 2, the second housing part 42 and the third housing part 43.

Each of the ventilation passages 9 is formed so as to extend in the rotary axis direction DX on the outer peripheral side of the electric motor 1.

Each of the ventilation passages 9 includes a vent hole 91 formed in the first housing part 41, a first ventilation passage 94 formed to communicate with the vent hole 91 and extend from the first housing part 41 to the second housing part 42, an intermediate exhaust port 92 formed in the second housing part 42 at a part corresponding to the end part of the first ventilation passage 94, a second ventilation passage 95 formed in the third housing part 43 so as to communicate with the intermediate exhaust port 92, and an exhaust port (exhaust part) 93 disposed on the rear side in the axial direction of each of the cooling fans 7 (described below) at a part corresponding to the end part of the second ventilation passage 95.

It is noted that the plurality of second ventilation passages 95 need not to be completely independent from each other, and may communicate with each other inside the third housing part 43. In other words, a plurality of ventilation passages and a plurality of cooling fans may not be provided in one-to-one correspondence. In an example, one cooling fan may ventilate a plurality of ventilation passages, or a plurality of cooling fans may ventilate a plurality of ventilation passages not individually via a communicating space.

As indicated by arrows in FIG. 1, when each of the cooling fans 7 rotates, air flow is generated in the rotary axis direction DX, and outside air flows in through the vent hole 91. The flowing-in outside air passes through the inside of the first ventilation passage 94 toward the rear in the axial direction, flows out through the intermediate exhaust port 92, passes through the inside of the third housing part 43 (second ventilation passage 95), and is discharged from the exhaust port 93 to the external space. Thereby, the stator 2 which generates heat when the electric motor 1 operates is cooled, and further the rotor 3 is cooled via the stator 2.

The plurality of second ventilation passages 95 are completely independent from each other, and the plurality of second ventilation passages 95 and the plurality of cooling fans 7 are provided in one-to-one correspondence. The plurality of cooling fans 7 ventilate the plurality of corresponding ventilation passages 9, respectively. The plurality (four in the present embodiment) of cooling fans 7 are disposed so as to be housed in the third housing part 43. The cooling fans 7 are disposed on the rear side in the axial direction of the electric motor 1. Each of the cooling fans 7, which is a centrifugal fan as an example, rotates when a fan motor (not shown) is driven, whereby generating air flow in the axial direction.

As shown in FIG. 2, the plurality of cooling fans 7 are disposed on a plane perpendicular to the rotary axis X so as not to overlap with the rotary axis X. The plurality of cooling fans 7 are disposed outside the opened part 45 so as to surround the opened part 45 as viewed from the rotary axis direction DX. In other words, the plurality of cooling fans 7 are disposed apart from the rotary axis X by a predetermined distance, and thus the opened part 45 is enabled to be formed.

The plurality of cooling fans 7 are respectively driven by separate fan motors. Therefore, even if one of the fan motors stops driving, the cooling performance of the cooling mechanism 6 is maintained at a certain level or more. This enables to suppress performance deterioration and the like from occurring due to excessive temperature rise in the electric motor 1.

As shown in FIG. 2, the third housing part 43 has the end face part 44 disposed on the opposite side to the second housing part 42 in the rotary axis direction DX. The end face part 44 is an end face part disposed on the rear side in the axial direction of the third housing part 43. The end face part 44 has the plurality (four in the present embodiment) of exhaust ports 93 and the opened part 45 formed at the center part.

The plurality of exhaust ports 93, which correspond to end parts (end parts on the rear side in the axial direction) of the ventilation passages 9, are disposed so as to respectively correspond to the plurality of cooling fans 7. The plurality of exhaust ports 93 are disposed on a plane perpendicular to the rotary axis X so as not to overlap with the rotary axis X. The plurality of exhaust ports 93 are disposed outside the opened part 45 so as to surround the opened part 45 as viewed from the rotary axis direction DX.

The opened part 45 is formed with the rotary axis X as a center. The opened part 45 is formed at the center part of the end face part 44. Specifically, the opened part 45 is formed in a region which includes a region crossing the rotary axis X and is located on the side of the rotary axis X with respect to the plurality of exhaust ports 93.

As described above, the opened part 45 is formed so as to communicate with the internal space 49 of the third housing part 43. Thus, the balance correcting component 35 disposed to be housed in the internal space 49A is visible and accessible from the outside through the opened part 45. That is, the electric motor 1 in the present embodiment is configured so that the balance correcting component 35 is adjustable through the opened part 45.

The internal space 49 is configured so as to be separated by an inner wall from the internal space of the stator 2 and the ventilation passages 9, and thus the electric motor 1 is not adversely affected in cooling performance and waterproof performance.

The present embodiment produces the following effects. The present embodiment enables to provide the electric motor 1 capable of ensuring a necessary space by use of the plurality of cooling fans 7 and devising of arrangement of the plurality of cooling fans 7, and the machine tool 10 including the electric motor 1.

The present embodiment enables to provide the electric motor 1 also capable of suppressing a rapid decrease in cooling performance by use of the plurality of cooling fans 7, and the machine tool 10 including the electric motor 1.

In the present embodiment, the plurality of cooling fans 7 are disposed in the third housing part 43, and disposed on a plane perpendicular to the rotary axis X so as not to overlap with the rotary axis X. Thereby, the electric motor 1 is able to have the opened part 45 provided in the region including the rotary axis X, and the internal space 49 formed so as to communicate with the opened part 45. Thereby, in the electric motor 1, the balance correcting component 35 attached to the rotary spindle 31 is disposed so as to be visible and accessible from the outside through the opened part 45. That is, the electric motor 1 in the present embodiment is configured so that the balance correcting component 35 is adjustable through the opened part 45.

Second Embodiment

Figure 3:
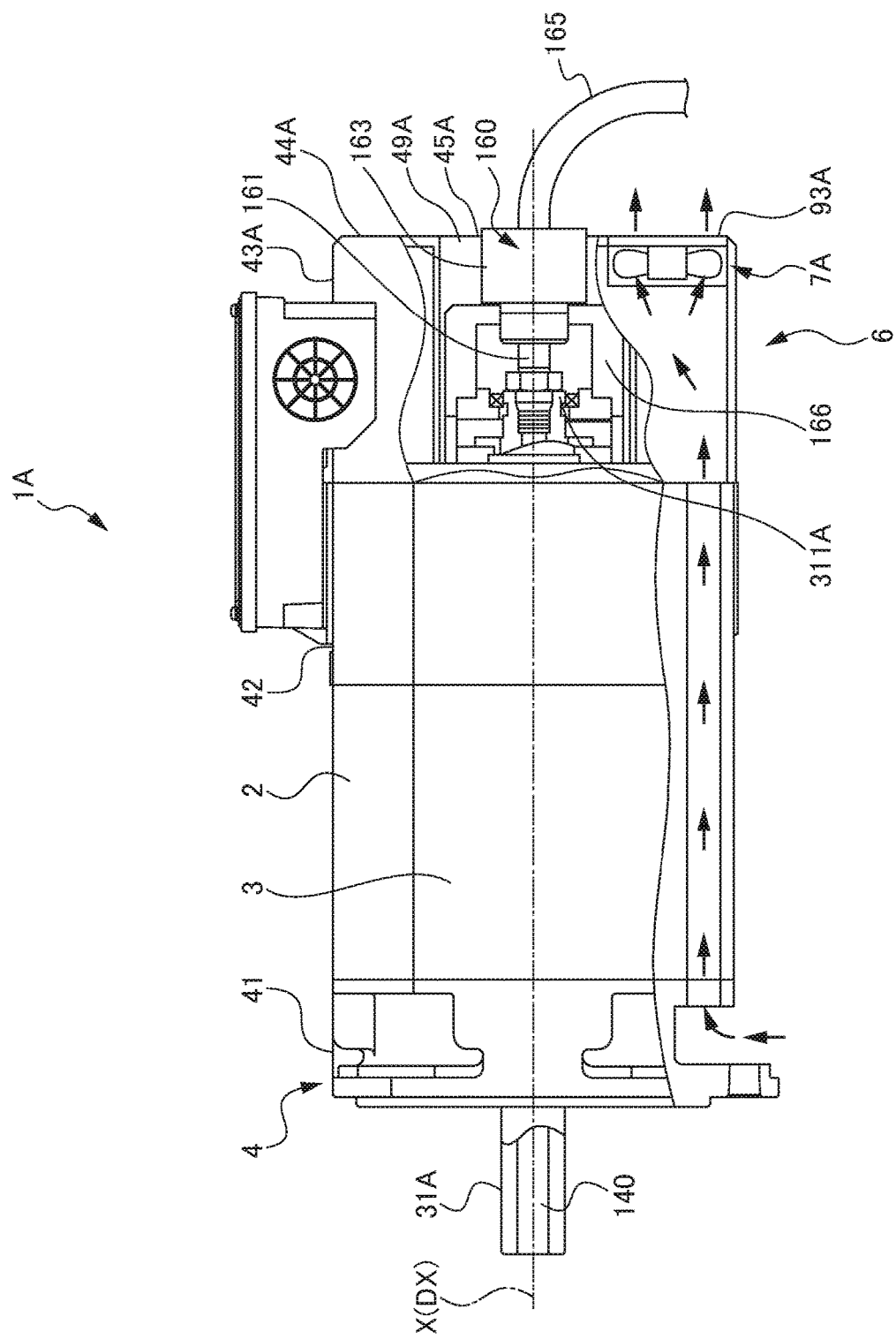
FIG. 3 is a cross sectional side view of an electric motor according to a second embodiment.
Figure 4:
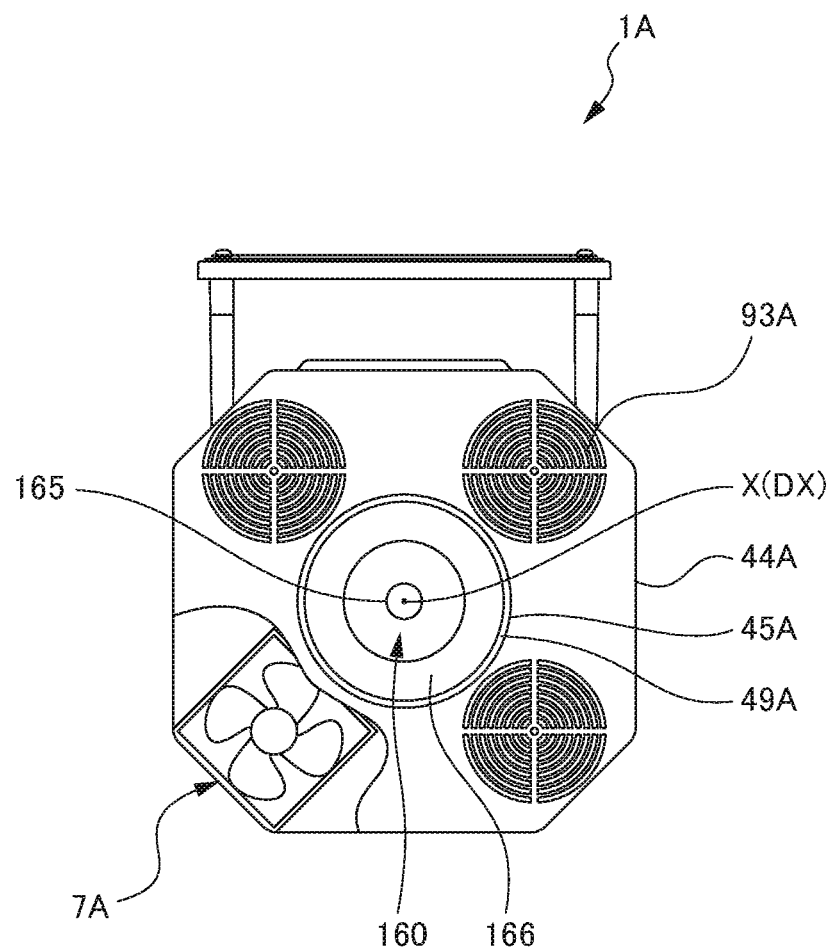
FIG. 4 is a view of the electric motor according to the second embodiment as viewed from the rear side thereof (other end side) in the axial direction.

Next, an electric motor 1A according to the second embodiment is described with reference to FIG. 3 and FIG. 4. FIG. 3 is a cross sectional side view of the electric motor according to the second embodiment. FIG. 4 is a view of the electric motor according to the second embodiment as viewed from the rear side thereof (other end side) in the axial direction.

As shown in FIG. 3, the electric motor 1A according to the present embodiment is an electric motor with a through hole, which has a through hole 140 for supplying coolant to a rotary spindle 31A.

As shown in FIG. 3, the rotary spindle 31A has the through hole 140 formed to go through from one end to the other end in the rotary axis direction DX. The through hole 140 is a through hole for supplying coolant liquid from the rear end to the front end in the axial direction.

In the present embodiment, a rotary joint part 160 (rotary member 161) for supplying coolant liquid is connected to a rear end part 311A on the rear side in the axial direction of the rotary spindle 31A. The rotary joint part 160 has the rotary member 161, a fixing member 163, and a supporting member 166. The rotary member 161 is connected to the rear end part 311A of the rotary spindle 31A. The fixing member 163 is supported and fixed by the supporting member 166 fixed to the second housing part 42. A coolant feed pipe 165 is connected to the fixing member 163 to feed coolant liquid toward the rotary member 161.

As shown in FIG. 4, in the second embodiment as in the first embodiment, a plurality of cooling fans 7A are disposed on a plane perpendicular to the rotary axis X so as not to overlap with the rotary axis X. The plurality of cooling fans 7A are disposed outside an opened part 45A so as to surround the opened part 45A as viewed from the rotary axis direction DX.

A plurality of exhaust ports 93A are disposed on a plane perpendicular to the rotary axis X so as not to overlap with the rotary axis X. The plurality of exhaust ports 93A are disposed outside the opened part 45A so as to surround the opened part 45A as viewed from the rotary axis direction DX.

The opened part 45A is formed with the rotary axis X as a center. The opened part 45A is formed at the center part of an end face part 44A. Specifically, the opened part 45A is formed in a region which includes a region crossing the rotary axis X and is located on the side of the rotary axis X with respect to the plurality of exhaust ports 93A.

The opened part 45A is formed so as to communicate with an internal space 49A of a third housing part 43A. Thus, the rear end part 311A (the end part of the through hole 140) of the rotary spindle 31A disposed to be housed in the internal space 49 is visible and accessible from the outside through the opened part 45A. In the present embodiment, the opened part 45A and the internal space 49A are each formed in such a size and shape that the rotary joint part 160 (the rotary member 161, the fixing member 163 and the supporting member 166) is inserted removably. That is, the electric motor 1A according to the present embodiment is configured so that the rotary joint part 160 is attachable to the rear end part 311A (the rear end part of the through hole 140) of the rotary spindle 31A disposed in the internal space 49A, through the opened part 45A.

The second embodiment produces the following effects in addition to the effects according to the first embodiment. In the present embodiment, the plurality of cooling fans 7A are disposed in the third housing part 43A on a plane perpendicular to the rotary axis X so as not to overlap with the rotary axis X. Thereby, as in the first embodiment, the electric motor 1A is able to have the opened part 45A provided in the region including the rotary axis X, and the internal space 49A formed so as to communicate with the opened part 45A. In the present embodiment, the opened part 45A and the internal space 49A are each formed in such a size and shape that the rotary joint part 160 (the rotary member 161, the fixing member 163 and the supporting member 166) is inserted removably. Thereby, the electric motor 1A according to the present embodiment is configured so that the rotary joint part 160 is attachable to the rear end part 311A (the rear end part of the through hole 140) of the rotary spindle 31A disposed in the internal space 49A through the opened part 45A.

Third Embodiment

Figure 5:
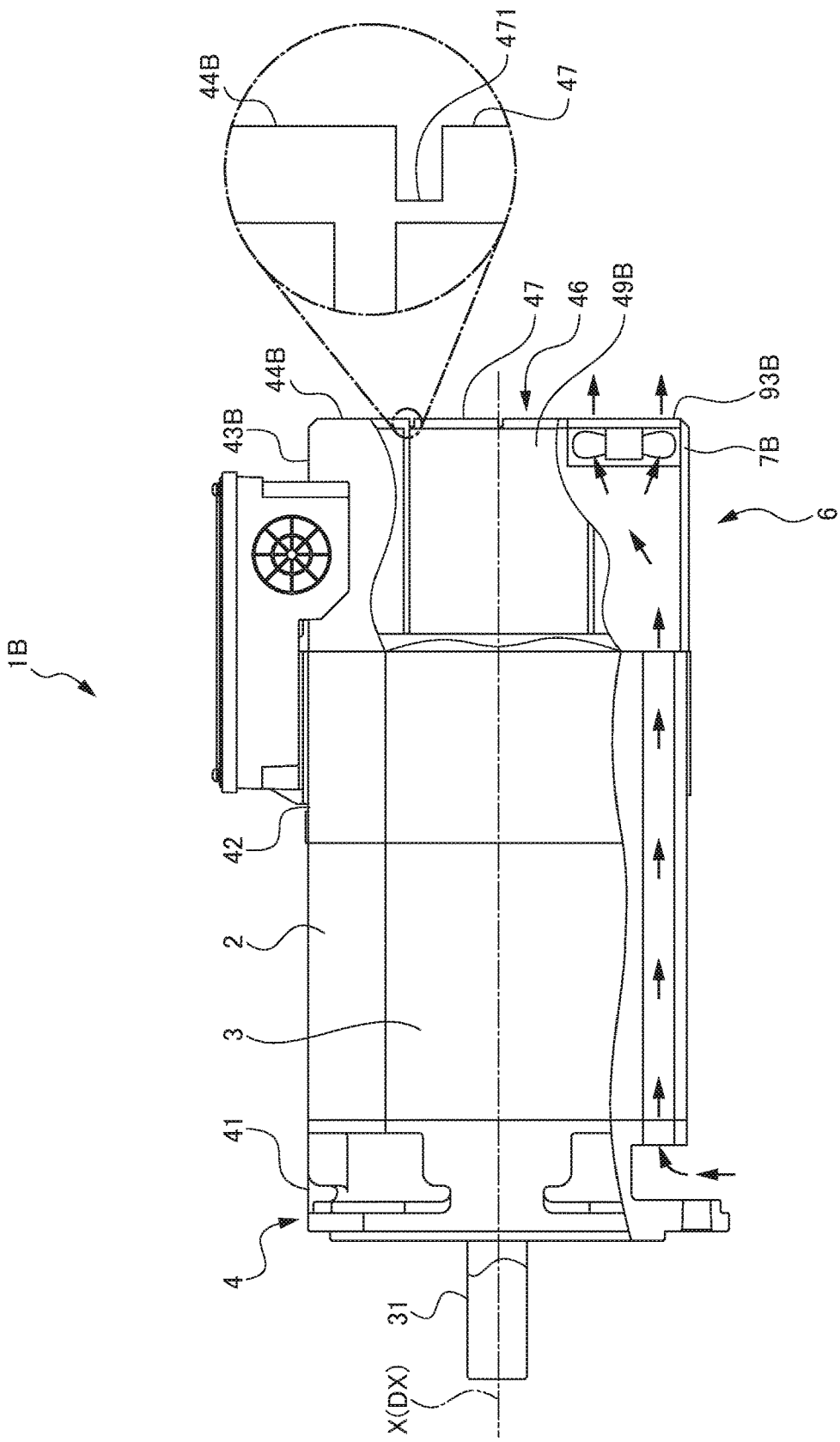
FIG. 5 is a cross sectional side view of an electric motor according to a third embodiment.
Figure 6:
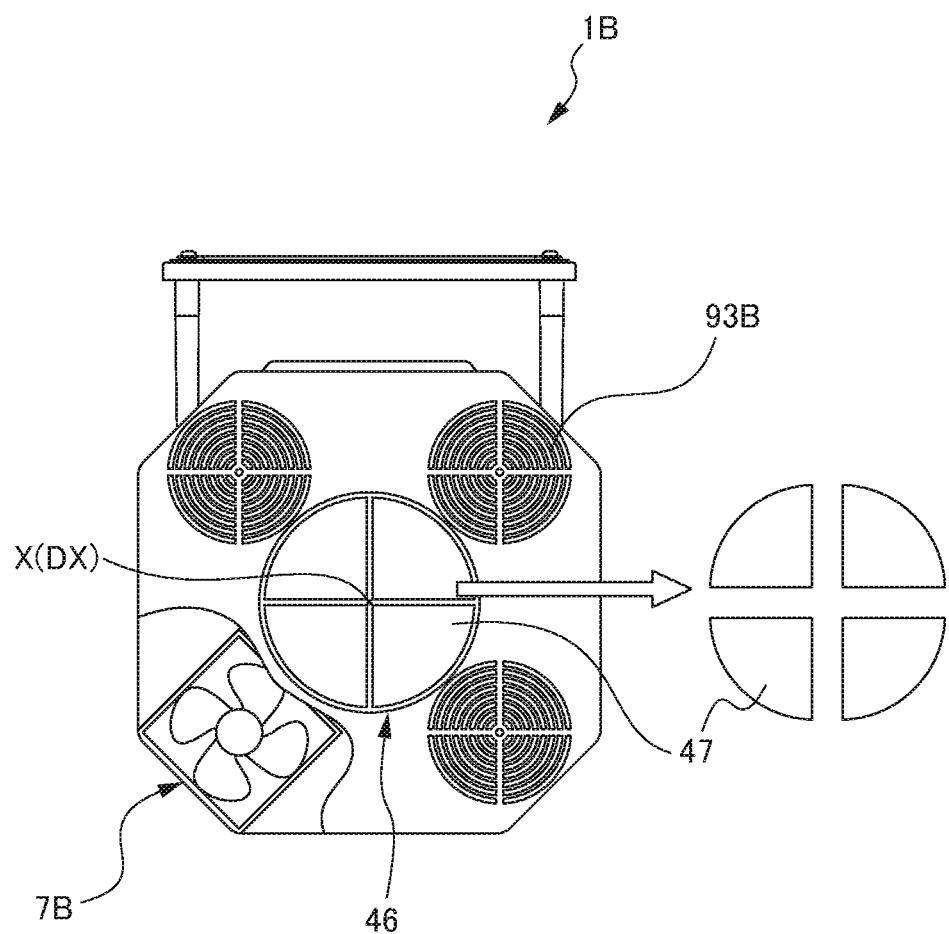
FIG. 6 is a view of the electric motor according to the third embodiment as viewed from the rear side thereof (other end side) in the axial direction.
Figure 7:
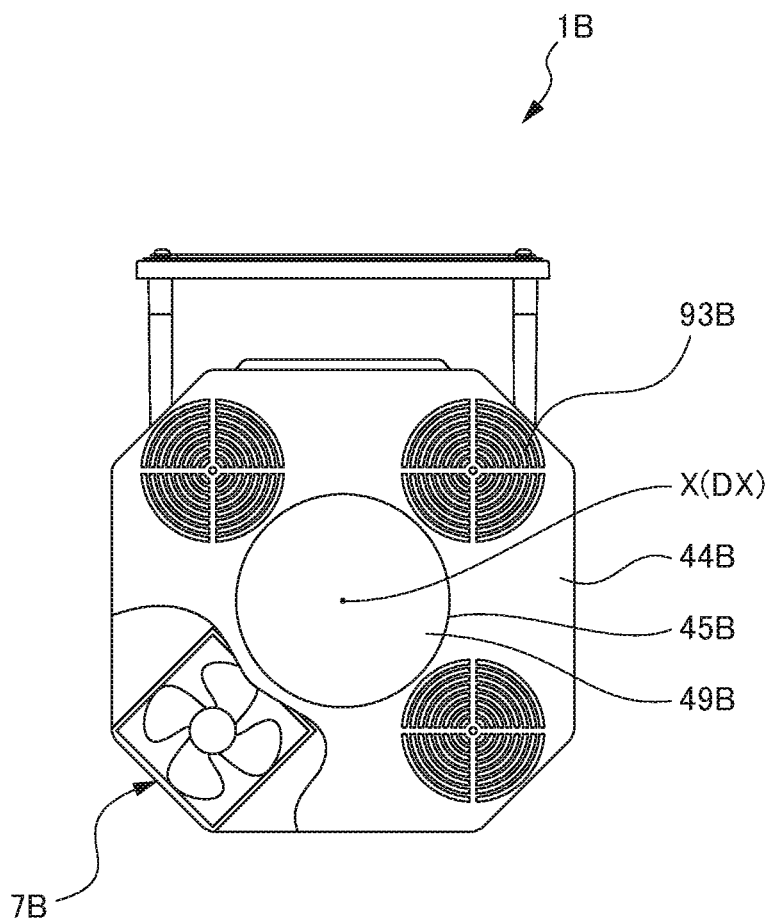
FIG. 7 is a view of the electric motor according to the third embodiment as viewed from the rear side (other end side) in the axial direction, illustrating a state in which an opened part is formed.

Subsequently, an electric motor according to the third embodiment is described with reference to FIG. 5 to FIG. 7. FIG. 5 is a cross sectional side view of the electric motor according to the third embodiment. FIG. 6 is a view of the electric motor according to the third embodiment as viewed from the rear side thereof (other end side) in the axial direction. FIG. 7 is a view of the electric motor according to the third embodiment as viewed from the rear side (other end side) in the axial direction, illustrating a state in which an opened part is formed.

As shown in FIG. 5, an electric motor 1B according to the third embodiment is a general solid-shaft electric motor. In the electric motor 1B according to the present embodiment, the opened part 45 formed on the rear side in the axial direction according to each of the first embodiment and the second embodiment is not indispensable. Therefore, in the present embodiment, an openable part 46 is formed in a third housing part 43B instead of the opened part 45. The electric motor 1B according to the present embodiment is configured to have no opened part at an initial state, but to be able to have an opened part afterwards when necessary.

As shown in FIG. 5 and FIG. 6, in the third embodiment as in the above-described embodiments, a plurality of cooling fans 7B are disposed on a plane perpendicular to the rotary axis X so as not to overlap with the rotary axis X. A plurality of exhaust ports 93B are also disposed on a plane perpendicular to the rotary axis X so as not to overlap with the rotary axis X.

The openable part 46 is formed in the same region as the region in which the opening is formed in each of the above-described embodiments. The openable part 46 is formed with the rotary axis X as a center. The openable part 46 is formed at the center part of the end face part 44B. Specifically, the openable part 46 is formed in a region which includes a region crossing the rotary axis X and is located on the side of the rotary axis X with respect to the plurality of exhaust ports 93B.

The openable part 46 has a closing part 47 disposed so as to be removable. As shown in a partially-enlarged view of FIG. 5, in an example, the closing part 47 is connected to the third housing part 43B via a thin wall part 471. The closing part 47 is configured so as to be separated (removed) from the third housing part 43B when the thin wall part 471 is cut off upon, for example, pressure from the outside (refer to FIG. 6). When the closing part 47 is removed, the openable part 46 serves as an opened part 45B. That is, the openable part 46 is configured to have the removable closing part 47 and so as to serve as the opened part 45B after removal of the closing part 47.

As shown in FIG. 7, the opened part 45B formed after removal of the closing part 47 is formed with the rotary axis X as a center, as in each of the above-described embodiments. The opened part 45B is formed at the center part of the end face part 44B. Specifically, the opened part 45B is formed in a region which includes a region crossing the rotary axis X and is located on the side of the rotary axis X with respect to the plurality of exhaust ports 93B. The opened part 45B is formed so as to communicate with an internal space 49B in the third housing part 43B, as in each of the above-described embodiments.

The third embodiment produces the following effects in addition to the effects according to the first embodiment and the second embodiment. In the present embodiment, the openable part 46 is provided on the end face part 44B. The openable part 46 is configured to have the closing part 47 disposed removably and to serve as the opened part 45B after removable of the closing part 47. Thereby, the electric motor 1B according to the present embodiment has no opened part at an initial state, but is able to have an opened part afterwards when necessary. In addition, the component members of the end face part are commonly used in the form having the opened part on the end face part and the form having no opened part on the end face part.

Fourth Embodiment

Figure 8:
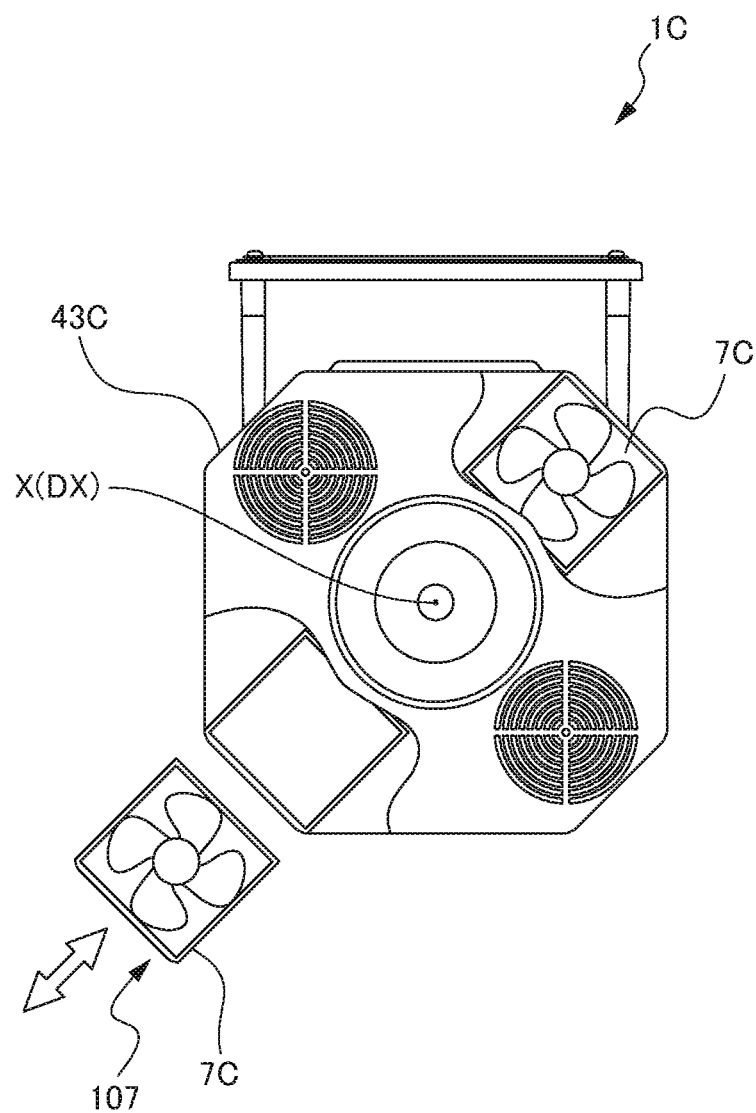
FIG. 8 is a view of an electric motor according to a fourth embodiment as viewed from the rear side thereof (other end side) in the axial direction.

Subsequently, an electric motor according to the fourth embodiment is described with reference to FIG. 8. FIG. 8 is a view of the electric motor according to the fourth embodiment as viewed from the rear side thereof (other end side) in the axial direction. As shown in FIG. 8, an electric motor 1C in the fourth embodiment has a plurality of cooling fans 7C which are attachable and detachable. Each of the plurality of cooling fans 7C is configured to be slidable along a plane direction perpendicular to the rotary axis direction DX (the paper surface direction in FIG. 8), and be attachable to and detachable from a third housing part 43C. That is, in the electric motor 1C, cooling fans 7C are configured to be replaceable individually.

In the present embodiment, in an example, the electric motor 1C may be configured to have cooling fan cartridges 107 each having each of the cooling fans 7C and a fan motor (not shown), and may be configured so that the cooling fan cartridges 107 are replaceable individually.

The fourth embodiment produces the following effects in addition to the effects according to the first embodiment to the third embodiment. In the present embodiment, each of the plurality of cooling fans 7C is configured to be slidable along a plane direction perpendicular to the rotary axis direction DX, and be attachable to and detachable from the third housing part 43C. Thereby, the electric fan 1C is configured so that the cooling fans 7C are replaceable individually.

It is noted that the present invention is not limited to the above-described embodiments, and the present invention includes modifications and improvements made within a range in which the object of the present invention can be achieved. The opened part 45 according to the first embodiment may be smaller than the balance correcting component 35, as long as at least one of the taps 36 provided on the balance correcting component 35 is visible and accessible.

Into the opened part according to the second embodiment, the whole part of the rotary joint part need not to be inserted, as long as at least the coolant feed pipe connected to the rotary joint part is enabled to be inserted.

The closing part according to the third embodiment need not to be connected to the third housing part, and may be fitted in the opened part, as an example. The closing part may be entirely formed with a thin wall.

Each of the cooling fans 7C according to the fourth embodiment may be configured to be movable in the axial direction, and may be configured to be attachable and detachable by moving in the axial direction.

EXPLANATION OF REFERENCE NUMERALS 1, 1A, 1B, 1C electric motor
2 Stator 3 rotor
4 Housing
7, 7A, 7B, 7C cooling fans (fans)
9 ventilation passage (ventilation part)
10 machine tool
11 Main spindle
12 main-spindle head
31, 31A rotary spindle
35 Balance correcting component
41 first housing part
42 second housing part
43, 43A, 43B, 43C third housing part
44, 44A, 44B end face part
45, 45A, 45B opened part
46 Openable part
47 closing part
49, 49A, 49B internal space
93, 93A, 93B exhaust part (exhaust port)
X rotary axis
DX rotary axis direction

What is claimed is:

1. An electric motor comprising:
   a stator having a tubular shape;
   a rotor rotatable around a rotary axis, the rotor having a rotary spindle disposed along the rotary axis;
   a first housing part disposed at an end of the stator in a rotary axis direction so as to rotatably support a front side spindle part that is part of partially house the rotary spindle, the rotary axis direction corresponding to a direction in which the rotary axis extends;
   a second housing part disposed at the other end of the stator in the rotary axis direction so as to rotatably support a rear side spindle part that is another part of the rotary spindle;
   a third housing part at a side opposite to the first housing part in the rotary axis direction with respect to the second housing part, the third housing part including an end face part disposed at a side opposite to the second housing part in the rotary axis direction;
   a plurality of ventilation parts formed so as to communicate with at least the stator, the second housing part, and the third housing part; and
   a plurality of fans for ventilating the plurality of ventilation parts, the plurality of fans being disposed in the third housing part on a plane perpendicular to the rotary axis so as not to overlap the rotary axis, wherein the end face part includes:
   a plurality of exhaust parts which are end parts for the plurality of ventilation parts, the plurality of exhaust parts being disposed so as to respectively correspond to the plurality of fans; and
   an opened part or an openable part disposed radially inside of the plurality of exhaust parts in a plane direction perpendicular to the rotary axis on a plane perpendicular to the rotary axis so as to overlap the rotary axis and be separated from the ventilation parts.

2. The electric motor according to claim 1, wherein
   the openable part has a removable closing part and serve as the opened part after removal of the closing part.

3. The electric motor according to claim 1, wherein
   each of the plurality of fans is configured to be slidable along a plane direction perpendicular to the rotary axis direction, and to be attachable to and detachable from the third housing part.

4. A machine tool comprising:
   the electric motor according to claim 1.

* * * * *